United States Patent
Muto

(10) Patent No.: US 11,962,340 B2
(45) Date of Patent: Apr. 16, 2024

(54) RADIO FREQUENCY MODULE AND COMMUNICATION DEVICE

(71) Applicant: Murata Manufacturing Co., Ltd., Kyoto (JP)

(72) Inventor: Hideki Muto, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 196 days.

(21) Appl. No.: 17/661,055

(22) Filed: Apr. 28, 2022

(65) Prior Publication Data

US 2022/0255578 A1  Aug. 11, 2022

Related U.S. Application Data

(63) Continuation of application No. PCT/JP2020/028140, filed on Jul. 20, 2020.

(30) Foreign Application Priority Data

Nov. 20, 2019  (JP) .................. 2019-210024

(51) Int. Cl.
  *H04B 1/401*  (2015.01)
  *H04B 1/04*  (2006.01)
  (Continued)

(52) U.S. Cl.
  CPC ........... *H04B 1/401* (2013.01); *H04B 1/0458* (2013.01); *H04B 1/405* (2013.01); *H04B 1/44* (2013.01)

(58) Field of Classification Search
  CPC .......... H04B 1/00; H04B 1/0458; H04B 1/40; H04B 1/401; H04B 1/405; H04B 1/44
  See application file for complete search history.

(56) References Cited

U.S. PATENT DOCUMENTS

2002/0151291 A1* 10/2002 Toncich .................. H04B 1/40
                                                     455/274
2017/0048859 A1  2/2017 Hayakawa
(Continued)

FOREIGN PATENT DOCUMENTS

JP  2017-038352 A  2/2017
JP  2017-098632 A  6/2017
(Continued)

OTHER PUBLICATIONS

International Search Report for International Patent Application No. PCT/JP2020/028140 dated Oct. 13, 2020.

*Primary Examiner* — Nguyen T Vo

(74) *Attorney, Agent, or Firm* — Pearne & Gordon LLP

(57) ABSTRACT

Isolation between the first path and second path is increased. A radio frequency module includes a first inductor, a second inductor, a third inductor, and a switch. The first inductor is provided in a first path through which a first communication signal travels. The second inductor is provided in a second path through which a second communication signal travels, the second path being used simultaneously with the first path. The third inductor is provided in a third path through which a third communication signal travels, the third path not being used simultaneously with the first path. The switch is provided between ground and a node in the third path and is connected to the third inductor. The third inductor is arranged between the first inductor and the second inductor.

20 Claims, 7 Drawing Sheets

(51) Int. Cl.
 *H04B 1/405* (2015.01)
 *H04B 1/44* (2006.01)

(56) References Cited

U.S. PATENT DOCUMENTS

| | | |
|---|---|---|
| 2017/0141801 A1 | 5/2017 | Watanabe |
| 2018/0123620 A1 | 5/2018 | Ueno |
| 2019/0089323 A1* | 3/2019 | Nosaka .................... H01Q 1/50 |
| 2019/0312608 A1* | 10/2019 | Muto ................... H04B 1/0458 |
| 2020/0228073 A1 | 7/2020 | Naniwa |
| 2020/0228151 A1 | 7/2020 | Naniwa et al. |
| 2020/0395972 A1 | 12/2020 | Matsumoto |

FOREIGN PATENT DOCUMENTS

| | | |
|---|---|---|
| WO | 2017/006866 A1 | 1/2017 |
| WO | 2019/065311 A1 | 4/2019 |
| WO | 2019/065419 A1 | 4/2019 |
| WO | 2019/188968 A1 | 10/2019 |

* cited by examiner

RADIO FREQUENCY MODULE AND COMMUNICATION DEVICE

CROSS REFERENCE TO RELATED APPLICATION

This is a continuation of International Application No. PCT/JP2020/028140 filed on Jul. 20, 2020 which claims priority from Japanese Patent Application No. 2019-210024 filed on Nov. 20, 2019. The contents of these applications are incorporated herein by reference in their entireties.

BACKGROUND ART

Technical Field

The present disclosure generally relates to radio frequency modules and communication devices and more specifically to a radio frequency module including a plurality of inductors and a communication device including the radio frequency module.

In general, a radio frequency module that performs communication using a plurality of paths simultaneously is known in the art (for example, see patent document 1). A radio frequency module described in the patent document 1 is capable of selecting one of carrier aggregation and non-carrier aggregation.

Patent Document 1: Japanese Unexamined Patent Application Publication No. 2017-38352

BRIEF SUMMARY

In recent years, in the technical field of radio frequency modules, in order to increase data transfer speed, the technique of simultaneous use of plural paths has been advanced. However, at the same time, there is also a need for downsizing of radio frequency module. Because of these, in some cases, it is difficult to secure a sufficient physical distance between inductors used in a radio frequency module, or flexibility in the arrangement of the inductors is reduced, and as a result, jumping of a signal occurs due to inductive coupling between the inductors.

The present disclosure provides a radio frequency module and a communication device, each of which enables to increase the isolation between a first path and a second path.

A radio frequency module according to one aspect of the present disclosure includes a first inductor, a second inductor, a third inductor, and a switch. The first inductor is provided in a first path through which a first communication signal travels. The second inductor is provided in a second path through which a second communication signal travels. The second path is used simultaneously with the first path. The third inductor is provided in a third path through which a third communication signal travels. The third path is not used simultaneously with the first path. The switch is provided between a node in the third path and ground and is connected to the third inductor. The third inductor is arranged between the first inductor and the second inductor.

A radio frequency module according to one aspect of the present disclosure includes a first inductor, a second inductor, a third inductor, a first switch, and a second switch. The first inductor is provided in a first path through which a first communication signal travels. The second inductor is provided in a second path through which a second communication signal travels. The third inductor is provided in a third path through which a third communication signal travels. The first switch is a switch provided between a node in the third path and ground. The first switch is connected to the third inductor. The second switch is a switch capable of connecting an antenna terminal to the first path and the second path simultaneously. The third inductor is arranged between the first inductor and the second inductor.

A communication device according to one aspect of the present disclosure includes the radio frequency module and a signal processing circuit. The signal processing circuit performs processing on the first communication signal, the second communication signal, and the third communication signal.

According to the radio frequency modules and the communication device according to the foregoing aspects of the present disclosure, it becomes possible to increase the isolation between the first path and the second path.

DETAILED DESCRIPTION

Figure 1:
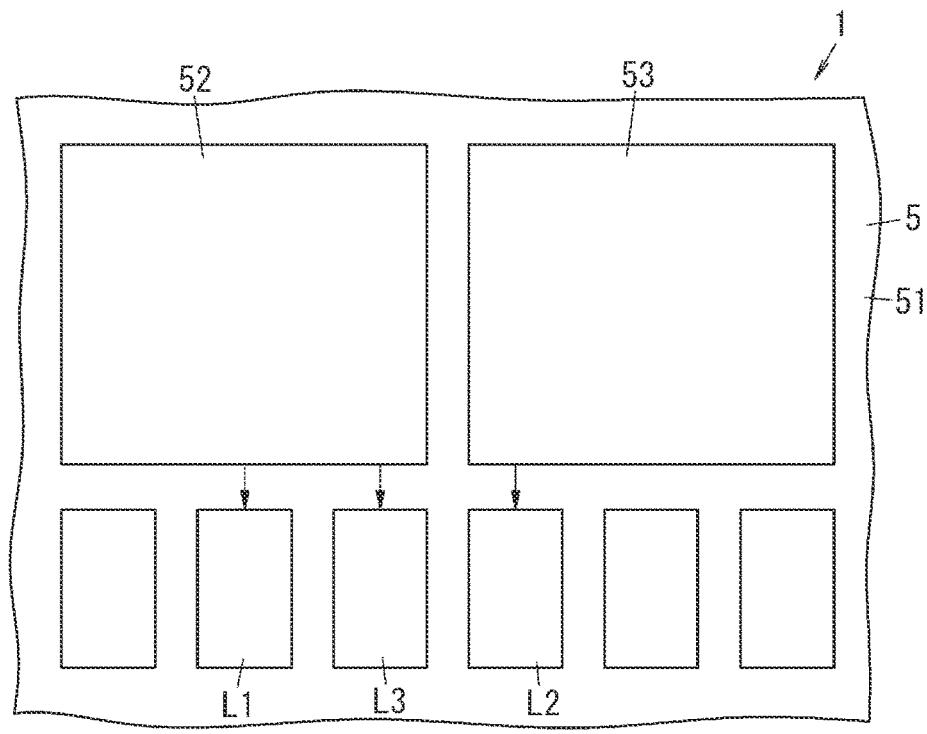
FIG. 1 is a plan view of a relevant part of a radio frequency module according to an embodiment 1.
Figure 6:
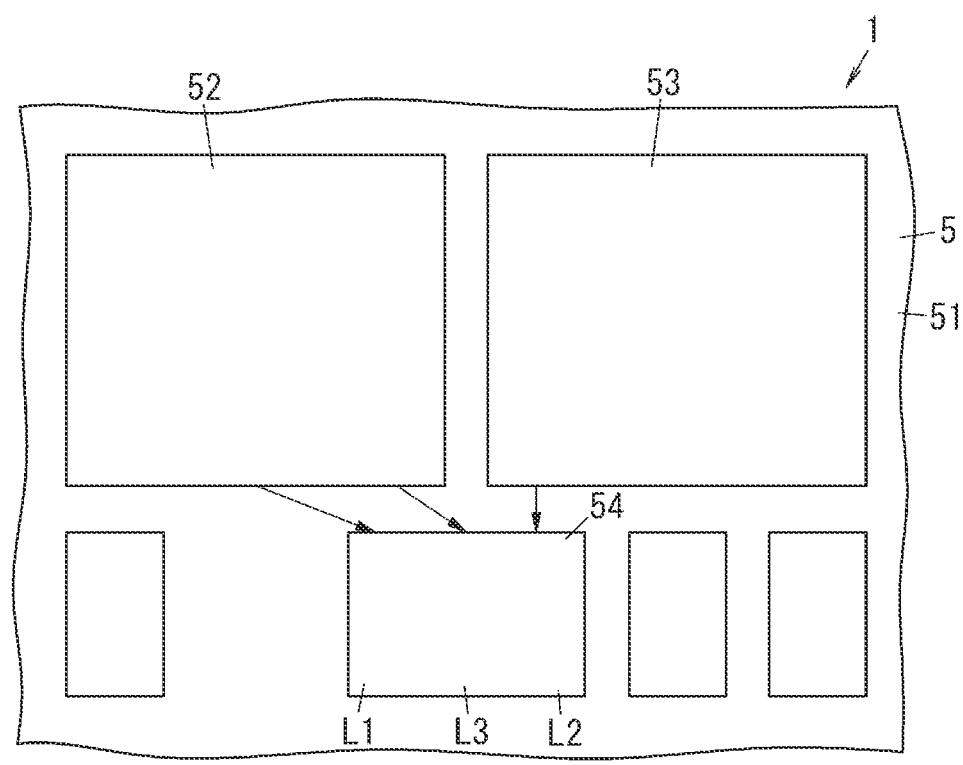
FIG. 6 is a plan view of a relevant part of a radio frequency module according to an embodiment 2.

Hereinafter, radio frequency modules and a communication device according to embodiments 1 to 4 are described with reference to the drawings. FIG. 1 and FIG. 6 that are referred in the following embodiments and the like are schematic diagrams, and each ratio of sizes or thicknesses of constituent elements in the drawings is not necessarily reflecting the actual ratio of dimensions.

Embodiment 1

(1) Radio Frequency Module

A configuration of a radio frequency module 1 according to the embodiment 1 is described with reference to the drawings.

Figure 3:
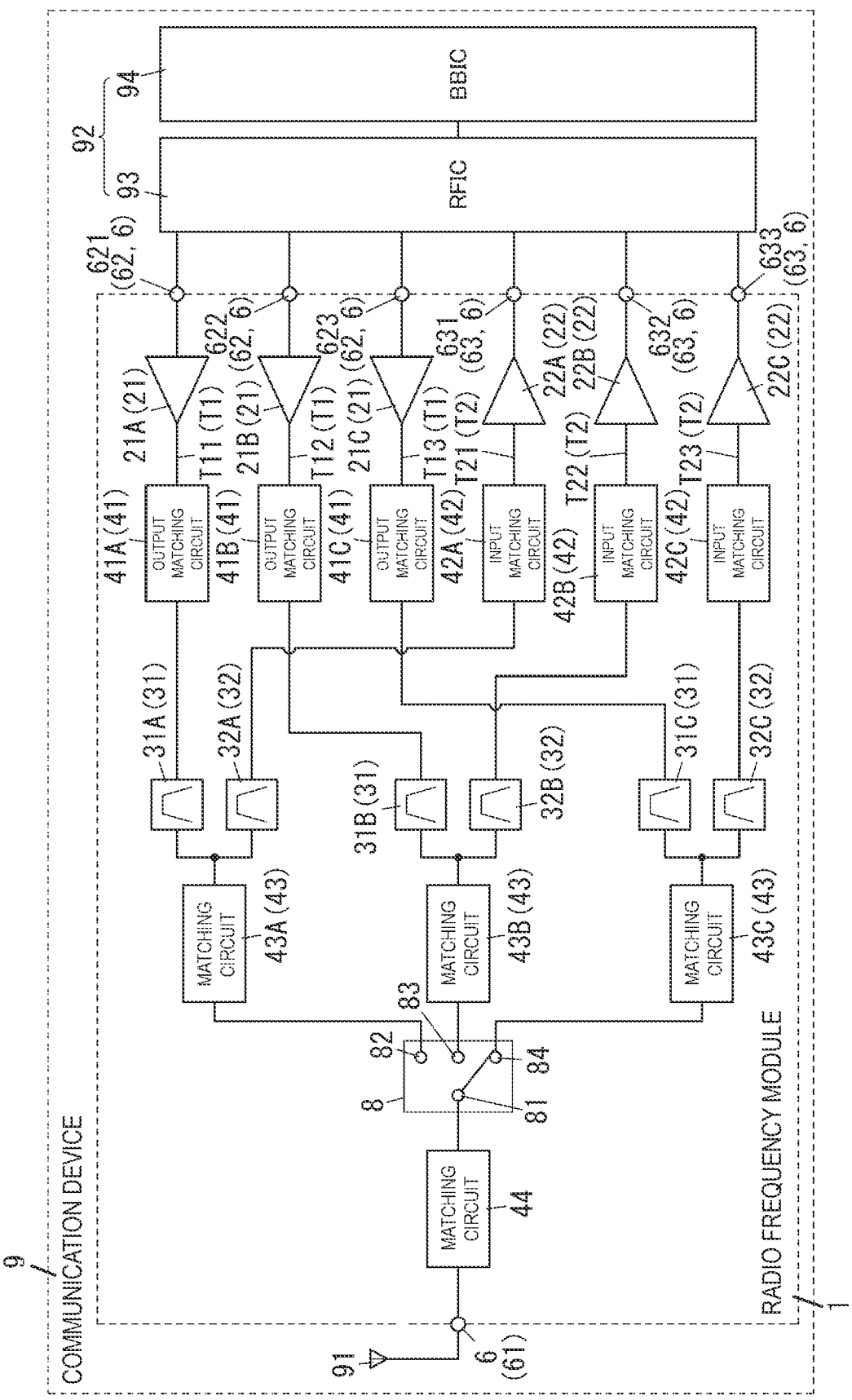
FIG. 3 is a schematic diagram of a communication device according to the embodiment 1.

As illustrated in FIG. 3, the radio frequency module 1 according to the embodiment 1 includes a plurality of (three in the illustrated example) power amplifiers 21 and a plurality of (three in the illustrated example) low noise amplifiers 22. Further, the radio frequency module 1 includes a plurality of (three in the illustrated example) transmission filters 31 and a plurality of (three in the illustrated example) of reception filters 32. Moreover, the radio frequency module 1 includes a plurality of (three in the illustrated example) output matching circuits 41, a plurality of (three in the illustrated example) input matching circuits 42, a plurality of (three in the illustrated example) matching circuits 43, a matching circuit 44, a plurality of external connection terminals 6, and a switch 8. Further, as illustrated in FIG. 1, the radio frequency module 1 includes a mounting board 5.

As illustrated in FIG. 3, for example, the radio frequency module 1 is used in a communication device 9. The communication device 9 is, for example, a mobile phone such as a smartphone. Note that the communication device 9 is not limited to a mobile phone, and may be, for example, a wearable terminal such as a smart watch. The radio frequency module 1 is, for example, a module compatible with the 4G (fourth generation mobile telecommunications) standard, the 5G (fifth generation mobile telecommunications) standard, or the like. The 4G standard is, for example, the 3GPP LTE standard (LTE: Long Term Evolution). The 5G standard is, for example, the 5G NR (New Radio). The radio frequency module 1 is a module compatible with carrier aggregation and dual connectivity.

The radio frequency module 1 performs communication in a plurality of communication bands. More specifically, the radio frequency module 1 transmits transmission signals of respective ones of the plurality of communication bands and receives reception signals of respective ones of the plurality of communication bands. Specifically, the radio frequency module 1 performs communication in a first communication band, communication in a second communication band, and communication in a third communication band. More specifically, the radio frequency module 1 transmits a transmission signal of the first communication band and receives a reception signal of the first communication band. Further, the radio frequency module 1 transmits a transmission signal of the second communication band and receives a reception signal of the second communication band. Moreover, the radio frequency module 1 transmits a transmission signal of the third communication band and receives a reception signal of the third communication band.

The radio frequency module 1 has a plurality of (three in the illustrated example) transmission paths T1 for transmitting transmission signals of the plurality of communication bands. The plurality of transmission paths T1 includes a first transmission path T11, a second transmission path T12, and a third transmission path T13. A first transmission signal of the first communication band travels along the first transmission path T11, a second transmission signal of the second communication band travels along the second transmission path T12, and a third transmission signal of the third communication band travels along the third transmission path T13.

The radio frequency module 1 has a plurality of (three in the illustrated example) reception paths T2 for receiving reception signals of the plurality of communication bands. The plurality of reception paths T2 includes a first reception path T21, a second reception path T22, and a third reception path T23. A first reception signal of the first communication band travels along the first reception path T21, a second reception signal of the second communication band travels along the second reception path T22, and a third reception signal of the third communication band travels along the third reception path T23.

The transmission signals and the reception signals are, for example, FDD (Frequency Division Duplex) signals. FDD is a wireless communication technique that performs transmission and reception by allocating different frequency bands for transmitting and receiving in wireless communication. Note that the transmission signals and the reception signals are not limited to the FDD signals and may alternatively be TDD (Time Division Duplex) signals. TDD is a wireless communication technique that alternates transmission and reception in time while allocating the same frequency band for transmitting and receiving in wireless communication.

(2) Circuit Configuration of Radio Frequency Module

Hereinafter, a circuit configuration of the radio frequency module 1 according to the embodiment 1 is described with reference to the drawings. Here, the description is provided for the case where transmission signals and reception signals are FDD signals.

(2.1) Power Amplifier

Each of the plurality of power amplifiers 21 illustrated in FIG. 3 is an amplifier that amplifies the amplitude of a transmission signal. Each power amplifier 21 is provided between an input terminal 62, which will be described below, and the output matching circuit 41 in the transmission path T1 that connects an antenna terminal 61 and the input terminal 62. Each power amplifier 21 is connected to an external circuit (for example, a signal processing circuit 92) via the input terminal 62. Further, the power amplifier 21 is connected to the output matching circuit 41.

The plurality of power amplifiers 21 includes a first power amplifier 21A, a second power amplifier 21B, and a third power amplifier 21C. The first power amplifier 21A is provided in the first transmission path T11, the second power amplifier 21B is provided in the second transmission path T12, and the third power amplifier 21C is provided in the third transmission path T13.

(2.2) Low Noise Amplifier

Each of the plurality of low noise amplifiers 22 illustrated in FIG. 3 is an amplifier that amplifies the amplitude of a reception signal with low noise. Each low noise amplifier 22 is provided between the input matching circuit 42 and an output terminal 63, which will be described below, in the reception path T2 that connects the antenna terminal 61 and the output terminal 63. Each low noise amplifier 22 is connected to an external circuit (for example, the signal processing circuit 92) via the output terminal 63.

The plurality of low noise amplifiers 22 includes a first low noise amplifier 22A, a second low noise amplifier 22B, and a third low noise amplifier 22C. The first low noise amplifier 22A is provided in the first reception path T21, the second low noise amplifier 22B is provided in the second reception path T22, and the third low noise amplifier 22C is provided in the third reception path T23.

(2.3) Transmission Filter

Each of the plurality of transmission filters 31 illustrated in FIG. 3 is a transmission filter of a communication band, which allows a transmission signal to pass. Each transmission filter 31 is provided in the transmission path T1 between the output matching circuit 41 and the antenna terminal 61. Of radio frequency signals amplified in the power amplifier 21, each transmission filter 31 allows a transmission signal of a transmission band of the foregoing communication band to pass.

The plurality of transmission filters 31 includes a first transmission filter 31A, a second transmission filter 31B, and a third transmission filter 31C. The first transmission filter 31A is provided in the first transmission path T1*l*, the second transmission filter 31B is provided in the second transmission path T12, and the third transmission filter 31C is provided in the third transmission path T13.

(2.4) Reception Filter

Each of the plurality of reception filters 32 illustrated in FIG. 3 is a reception filter of a communication band, which allows a reception signal to pass. Each reception filter 32 is provided between the antenna terminal 61 and the input matching circuit 42 in the reception path T2 that connects the antenna terminal 61 and the output terminal 63. Each reception filter 32 is connected to the low noise amplifier 22 by the reception path T2. Of radio frequency signals input from the antenna terminal 61, the reception filter 32 allows a reception signal of a reception band of the foregoing communication band to pass.

The plurality of reception filters 32 includes a first reception filter 32A, a second reception filter 32B, and a third reception filter 32C. The first reception filter 32A is provided in the first reception path T21, the second reception filter 32B is provided in the second reception path T22, and the third reception filter 32C is provided in the third reception path T23.

(2.5) Output Matching Circuit

As illustrated in FIG. 3, each of the plurality of output matching circuit 41 is provided in the transmission path T1 between the power amplifier 21 and the transmission filter 31. Each output matching circuit 41 is a circuit for providing impedance matching between the power amplifier 21 and the transmission filter 31.

Each of the plurality of output matching circuits 41 includes, for example, a plurality of inductors (not illustrated) and a plurality of capacitors (not illustrated). Note that each output matching circuit 41 is not limited to have the configuration that includes a plurality of inductors and a plurality of capacitors, and for example, may alternatively have a configuration that includes only a plurality of inductors or a configuration that includes only a plurality of capacitors. Alternatively, each output matching circuit 41 may have a configuration that includes only a single inductor or a configuration that includes only a single capacitor. Alternatively, each output matching circuit 41 may have a configuration that only includes a single inductor and a single capacitor.

The plurality of output matching circuits 41 includes a first output matching circuit 41A, a second output matching circuit 41B, and a third output matching circuit 41C. The first output matching circuit 41A is provided in the first transmission path T11, the second output matching circuit 41B is provided in the second transmission path T12, and the third output matching circuit 41C is provided in the third transmission path T13.

(2.6) Input Matching Circuit

As illustrated in FIG. 3, each of the plurality of input matching circuits 42 is provided in the reception path T2 between the reception filter 32 and the low noise amplifier 22. Each input matching circuit 42 is a circuit for providing impedance matching between the reception filter 32 and the low noise amplifier 22.

Each of the plurality of input matching circuits 42 has, for example, a configuration that includes a single inductor. Note that each input matching circuit 42 is not limited to have the configuration that includes a single inductor, and for example, may alternatively have a configuration that includes a plurality of inductors or a configuration that includes a plurality of inductors and a plurality of capacitors. That is to say, each input matching circuit 42 includes at least one inductor.

The plurality of input matching circuits 42 includes a first input matching circuit 42A, a second input matching circuit 42B, and a third input matching circuit 42C. The first input matching circuit 42A is provided in the first reception path T21, the second input matching circuit 42B is provided in the second reception path T22, and the third input matching circuit 42C is provided in the third reception path T23.

(2.7) Matching Circuit

As illustrated in FIG. 3, each of the plurality of matching circuits 43 is provided in such a manner as to be positioned between the transmission filter 31 and the switch 8 in the transmission path T1 while being positioned between the switch 8 and the reception filter 32 in the reception path T2.

Each of the plurality of matching circuits 43 has, for example, a configuration that includes a single inductor. The inductor of each matching circuit 43 is, for example, provided between a node in the transmission path T1 and ground. Note that each matching circuit 43 is not limited to have the configuration that includes a single inductor, and for example, may alternatively have a configuration that includes a plurality of inductors or a configuration that includes a plurality of inductors and a plurality of capacitors.

The plurality of matching circuits 43 includes a first matching circuit 43A, a second matching circuit 43B, and a third matching circuit 43C. The first matching circuit 43A is provided in the first transmission path T1l and the first reception path T21, the second input matching circuit 42B is provided in the second transmission path T12 and the second reception path T22, and the third input matching circuit 42C is provided in the third transmission path T13 and the third reception path T23.

As illustrated in FIG. 3, the matching circuit 44 is provided between the antenna terminal 61 and the switch 8. The matching circuit 44 has, for example, the configuration that includes a single inductor.

The matching circuit 44 has, for example, the configuration that includes a single inductor. The inductor of the matching circuit 44 is, for example, provided between the ground and a node in the path connecting the antenna terminal 61 and the switch 8. Note that the matching circuit 44 is not limited to have the configuration that includes a single inductor, and for example, may alternatively have a configuration that includes a plurality of inductors or a configuration that includes a plurality of inductors and a plurality of capacitors.

(2.8) Switch

As illustrated in FIG. 3, the switch 8 is a switch that switches the path (the transmission path T1, the reception path T2) to be connected to the antenna 91. The switch 8 has a common terminal 81 and three selection terminals 82 to 84. The common terminal 81 is connected to the antenna terminal 61 which will be described below. The selection terminal 82 is connected to the first matching circuit 43A. The selection terminal 83 is connected to the second matching circuit 43B. The selection terminal 84 is connected to the third matching circuit 43C.

The switch 8 is a switch capable of connecting two or more of the three selection terminals 82 to 84 to the common terminal 81. The switch 8 is a direct mapping switch capable of establishing one-to-many connection. The switch 8 is, for example, a switch IC (Integrated Circuit). The switch 8 is controlled, for example, by the signal processing circuit 92. The switch 8 switches the connection state between the common terminal 81 and the three selection terminals 82 to 84 in response to a control signal from a RF signal processing circuit 93 of the signal processing circuit 92.

(2.9) External Connection Terminal

As illustrated in FIG. 3, the plurality of external connection terminals 6 includes the antenna terminal 61, a plurality of (three in the illustrated example) the input terminals 62, and a plurality of (three in the illustrated example) the output terminals 63. The antenna terminal 61 is a terminal to which the antenna 91, which will be described below, is connected. The plurality of the input terminals 62 and the plurality of the output terminals 63 are connected to the signal processing circuit 92, which will be described below. Each of the plurality of the input terminals 62 is a terminal through which a radio frequency signal (transmission signal) from an external circuit is input to the radio frequency module 1. The plurality of the input terminals 62 includes a first input terminal 621, a second input terminal 622, and a third input terminal 623. Each of the plurality of the output terminals 63 is a terminal from which a radio frequency signal (reception signal) from the low noise amplifier 22 is output to an external circuit. The plurality of the output terminals 63 includes a first output terminal 631, a second output terminal 632, and a third output terminal 633.

(3) Structure of Radio Frequency Module

Hereinafter, a structure of the radio frequency module 1 according to the embodiment 1 is described with reference to the drawings.

As illustrated in FIG. 1, the radio frequency module 1 includes the mounting board 5 and a plurality of circuit elements. The radio frequency module 1 includes, as the plurality of circuit elements, the plurality of power amplifiers 21, the plurality of low noise amplifiers 22, the plurality of transmission filters 31, the plurality of reception filters 32, the plurality of output matching circuits 41, and the plurality of input matching circuits 42. In FIG. 1, of the plurality of circuit elements, the first reception filter 32A and the third reception filter 32C form a single chip 52, and the second reception filter 32B forms a single chip 53. Further, in FIG. 1, of the plurality of circuit elements, the illustration of circuit elements other than inductors of the plurality of reception filters 32 and the plurality of input matching circuits 42 is omitted.

The radio frequency module 1 is electrically connectable to an external board (not illustrated). The external board corresponds to, for example, a mother board of a mobile phone, a communication instrument, or the like. Note that "the radio frequency module 1 is electrically connectable to an external board" means to include not only the case where the radio frequency module 1 is directly mounted on the external board but also the case where the radio frequency module 1 is indirectly mounted on the external board. Note that "the case where the radio frequency module 1 is indirectly mounted on the external board" includes the case where the radio frequency module 1 is mounted on another radio frequency module that is mounted the external board and any other similar cases.

(3.1) Mounting Board

As illustrated in FIG. 1, the mounting board 5 has a first principal surface 51 and a second principal surface (not illustrated). The first principal surface 51 and the second principal surface face each other in a thickness direction of the mounting board 5. The second principal surface faces an external board when the radio frequency module 1 is provided on the external board (not illustrated).

The mounting board 5 is a multilayer board in which a plurality of dielectric layers are stacked on top of each other. The mounting board 5 has a plurality of conductor pattern portions (not illustrated) and a plurality of column-like electrodes (not illustrated). The plurality of conductor pattern portions includes a conductor pattern portion that is set at a ground potential. The plurality of column-like electrodes are used for electrically connecting the circuit elements mounted on the first principal surface 51 and the conductor pattern portions of the mounting board 5. Further, the plurality of column-like electrodes are used for electrically connecting the external connection terminals 6 to the circuit elements mounted on the first principal surface 51 and the conductor pattern portions of the mounting board 5.

(3.2) Reception Filter

For example, the plurality of reception filters 32 are each an acoustic wave filter including a plurality of series arm resonators and a plurality of parallel arm resonators. The acoustic wave filter is, for example, a SAW (Surface Acoustic Wave) filter that utilizes a surface acoustic wave. Moreover, the reception filter 32 may include at least one of an inductor and a capacitor, which is connected in series or in parallel to any one of the plurality of series arm resonators, or may include an inductor or a capacitor, which is connected in series or in parallel to any one of the plurality of parallel arm resonators.

(3.3) Input Matching Circuit

As illustrated in FIG. 1, the plurality of input matching circuit 42 is arranged on the first principal surface 51 of the mounting board 5. As described above, the input matching circuit 42 includes an inductor. The inductor of the input matching circuit 42 is a surface mount component or at least a part of an integrated passive device. The inductor is, for example, a chip-like element (chip inductor) mounted on the first principal surface 51 of the mounting board 5 or a conductor pattern portion (wire inductor) provided on or in the mounting board 5. In the example of FIG. 1, the inductor of the input matching circuit 42 is mounted on the first principal surface 51 of the mounting board 5. That is to say, the input matching circuit 42 is arranged closer to the first principal surface 51 than the second principal surface in the mounting board 5. In the case where the inductor of the input matching circuit 42 is a chip inductor, the outer shape of the inductor is a rectangular shape in the plan view seen from the thickness direction of the mounting board 5.

(3.4) Low Noise Amplifier

Each of the plurality of low noise amplifiers 22 is arranged, for example, on the first principal surface 51 of the mounting board 5. Note that part of the low noise amplifier 22 may be mounted on the first principal surface 51 of the mounting board 5, and the remaining of the low noise amplifier 22 may be installed in the inside of the mounting board 5. That is to say, the low noise amplifier 22 is arranged closer to the first principal surface 51 in the mounting board 5 and at least has a part that is mounted on the first principal surface 51.

(4) Spatial Relationship of Inductors of Matching Circuits

Next, the spatial relationship of inductors of matching circuits is described with reference to FIG. 1 and FIG. 2.

Figure 2:
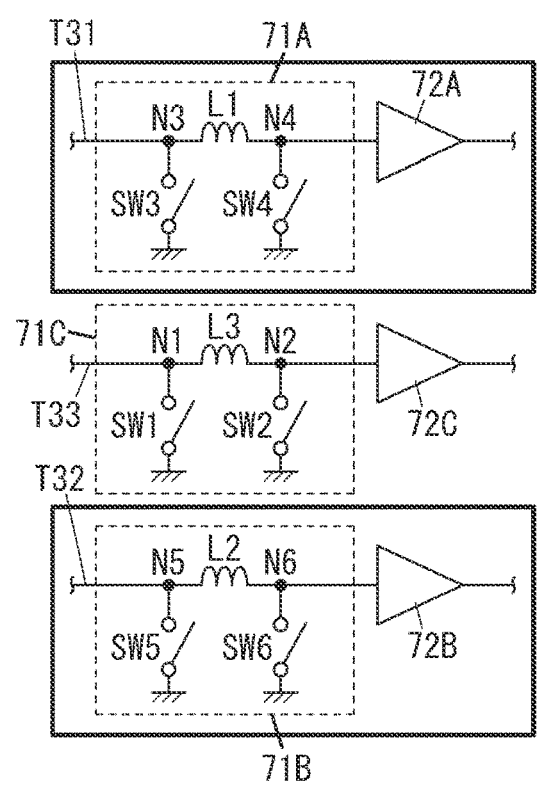
FIG. 2 is a schematic diagram of the relevant part of the foregoing radio frequency module.

The radio frequency module 1 according to the embodiment 1 includes a plurality of (three in the illustrated example) matching circuits 71A to 71C, such as illustrated in FIG. 2.

The matching circuit 71A includes a first inductor L1 and a plurality of switches SW3 and SW4. The first inductor L1 is provided in a first path T31 through which a first communication signal travels. More specifically, the first inductor L1 is connected in series between two nodes N1 and N2 of the first path T31. The switch SW3 is provided between a node N3 in the first path T31 and the ground and is connected to the first inductor L1. When the switch SW3 is in the ON state, one end side of the first inductor L1 is at ground potential. The switch SW4 is provided between a node N4 in the first path T31 and the ground and is connected to the first inductor L1. When the switch SW4 is in the ON state, the other end side of the first inductor L1 is at ground potential.

The matching circuit 71B includes a second inductor L2 and a plurality of switches SW5 and SW6. The second inductor L2 is provided in a second path T32 through which a second communication signal travels. More specifically, the first inductor L1 is connected in series between two nodes N1 and N2 of the first path T31.

The switch SW5 is provided between a node N5 in the second path T32 and the ground and is connected to the second inductor L2. When the switch SW5 is in the ON state, one end side of the second inductor L2 is at ground potential. The switch SW6 is provided between a node N6 in the second path T32 and the ground and is connected to the second inductor L2. When the switch SW6 is in the ON state, the other end side of the second inductor L2 is at ground potential.

In this case, the switch 8 is a switch capable of connecting the antenna terminal 61 to the first path T31 and the second path T32 simultaneously. The second path T32 is used simultaneously with the first path T31.

The matching circuit 71C includes a third inductor L3 and a plurality of switches SW1 and SW2. The third inductor L3 is provided in a third path T33 through which a third communication signal travels. The switch SW1 is provided between one end side (side opposite to the low noise amplifier 72C side) of the third inductor L3 and the ground. The switch SW1 is provided between a node N1 in the third path T33 and the ground and is connected to the third inductor L3. The switch SW1 enables to change a load connected to the third inductor L3. More specifically, when the switch SW1 is in the ON state, one end side of the third inductor L3 is at ground potential. The switch SW2 is provided between the other end side (low noise amplifier 72C side) of the third inductor L3 and the ground. The switch SW2 is provided between a node N2 in the third path T33 and the ground and is connected to the third inductor L3. The switch SW2 enables to change a load connected to the third inductor L3. More specifically, when the switch SW2 is in the ON state, the other end side of the third inductor L3 is at ground potential.

In this case, the third path T33 is the path that is not used simultaneously with the first path T31. That is to say, the switch 8 does not connect the antenna terminal 61 to the first path T31 and the third path T33 simultaneously.

As illustrated in FIG. 1, the third inductor L3 is arranged between the first inductor L1 and the second inductor L2 in the matching circuits 71A to 71C described above.

In this section, the spatial relationship of inductors of a plurality of input matching circuits 42 is described. Here, it is assumed that the first reception path T21 and the second reception path T22 are used simultaneously. In this case, the third reception path T23 is the path that is not used simultaneously with the first reception path T21 or the second reception path T22.

As described above, the radio frequency module 1 includes the plurality of input matching circuits 42. In FIG. 2, the first input matching circuit 42A corresponds to the matching circuit 71A, the second input matching circuit 42B corresponds to the matching circuit 71B, and the third input matching circuit 42C corresponds to the matching circuit 71C.

Further, as described above, each input matching circuit 42 has the configuration that includes an inductor. In FIG. 2, the inductor of the first input matching circuit 42A corresponds to the first inductor L1, the inductor of the second input matching circuit 42B corresponds to the second inductor L2, and the inductor of the third input matching circuit 42C corresponds to the third inductor L3.

The inductors of the plurality of input matching circuits 42 are arranged as illustrated in FIG. 1. The third inductor L3 is arranged between the first inductor L1 and the second inductor L2. In the present specification, "being arranged between the first inductor L1 and the second inductor L2" means that the third inductor L3 is arranged in an area surrounded by straight lines each connecting an arbitrary point of the first inductor L1 and an arbitrary point of the second inductor L2.

Because the third conductor L3 is arranged between the first inductor L1 and the second inductor L2, the degree of coupling between the first inductor L1 and the third inductor L3 increases, and the degree of coupling between the second inductor L2 and the third inductor L3 increases. As a result, it becomes possible to improve the isolation between the first reception path T21 and the second reception path T22, which are used simultaneously.

Particularly, in the state where the third inductor L3 is arranged between the first inductor L1 and the second inductor L2, the switches SW1 and SW2, which are arranged on both ends of the third inductor L3, are turned to the ON state. Both ends of the third inductor L3 are at ground potential. This enables to further improve the isolation between the first reception path T21 and the second reception path T22, which are used simultaneously.

On the other hand, in the case where the third inductor L3 is not arranged between the first inductor L1 and the second inductor L2, the isolation decreases in between the first reception path T21 where the first inductor L1 is provided and the second reception path T22 where the second inductor L2 is provided.

For example, in the case where the coupling coefficient between the first inductor L1 and the second inductor L2 in the paths that are used simultaneously is 0.30, the isolation between the foregoing two paths is 17 dB.

On the other hand, in the case where the third inductor L3 is arranged between the first inductor L1 and the second inductor L2, which are used simultaneously, and the third inductor L3 is not used simultaneously with the first inductor L1 or the second inductor L2, it becomes possible to have a coupling coefficient of 0.50 between the first inductor L1 and the third inductor L3. Similarly, it also becomes possible to have a coupling coefficient of 0.50 between the second inductor L2 and the third inductor L3.

According to the above, it becomes possible to improve the isolation between two paths that are used simultaneously without necessarily changing the coupling coefficient between these two paths.

Note that the first inductor L1 and the second inductor L2 are arranged in such a way that the degree of inductive coupling between the first inductor L1 and the second inductor L2 has a positive value. According to the above, it becomes possible to further increase the isolation between communication in the first path T31 and communication in the second path T32.

Further, as described above, the second inductor L2 is provided in the second path T32 between the reception filter 32 and the low noise amplifier 72B. According to the above, it becomes possible to reduce the effect of the first inductor L1 on the input side of the low noise amplifier 72C that is relatively susceptible to noises. This enables to further increase the isolation between communication in the first path T31 and communication in the second path T32.

(5) Detailed Structure of Each Constituent Element of Radio Frequency Module (5.1) Mounting Board The mounting board 5 illustrated in FIG. 1 is, for example, a printed wiring board, a LTCC (Low Temperature Co-fired Ceramics) board, or the like. In this case, the mounting board 5 is, for example, a multilayer board including a plurality of dielectric layers (not illustrated) and a plurality of conductor pattern portions (not illustrated). The plurality of dielectric layers and the plurality of conductor pattern portions are stacked on top of each other in the thickness direction of the mounting board 5. The plurality of conductor pattern portions are respectively formed in predetermined shapes. Each of the plurality of conductor pattern portions includes one or more conductor portions in one plane orthogonal to the thickness direction of the mounting board 5. The material of each conductor pattern portion is, for example, copper.

The first principal surface 51 and the second principal surface of the mounting board 5 are separated from each other in the thickness direction of the mounting board 5 and cross the thickness direction of the mounting board 5. The first principal surface 51 of the mounting board 5 is, for example, orthogonal to the thickness direction of the mounting board 5. However, the first principal surface 51 of the mounting board 5 may include, for example, a side surface of a conductor portion or the like as a surface that is not orthogonal to the thickness direction. Further, the second principal surface of the mounting board 5 is, for example, orthogonal to the thickness direction of the mounting board 5. However, the second principal surface of the mounting board 5 may include, for example, a side surface of a conductor portion or the like as a surface that is not orthogonal to the thickness direction. Further, micro-asperities, dips, or bumps may be formed on the first principal surface 51 and the second principal surface of the mounting board 5.

(5.2) Filter

Detailed structures of the plurality of transmission filters 31 and the plurality of reception filters 32 are described. In the following description, the plurality of transmission filters 31 and the plurality of reception filters 32 are referred to as filters without necessarily distinction.

The filter is a one-chip filter. Here, in the filter, for example, each of a plurality of series arm resonators and a plurality of parallel arm resonators is made up of an acoustic wave resonator. In this case, the filter includes, for example, a substrate, a piezoelectric layer, and a plurality of IDT electrodes (Interdigital Transducer). The substrate has a first surface and a second surface. The piezoelectric layer is provided on the first surface of the substrate. The piezoelectric layer is provided on a low acoustic velocity film. The plurality of IDT electrodes are provided on the piezoelectric layer. Here, the low acoustic velocity film is provided on the substrate directly or indirectly. Further, the piezoelectric layer is provided on the low acoustic velocity film directly or indirectly. In the low acoustic velocity film, the acoustic velocity of a bulk wave propagating therethrough is lower than the acoustic velocity of a bulk wave propagating through the piezoelectric layer. In the substrate, the acoustic velocity of a bulk wave propagating therethrough is higher than the acoustic velocity of an acoustic wave propagating through the piezoelectric layer. The material of the piezoelectric layer is, for example, lithium tantalate. The material of the low acoustic velocity film is, for example, silicon oxide. The substrate is, for example, a silicon substrate. The thickness of the piezoelectric layer is, for example, less than or equal to $3.5\lambda$ where $\lambda$ is the wavelength of an acoustic wave, which is determined based on the electrode finger period of the IDT electrode. The thickness of the low acoustic velocity film is, for example, less than or equal to $2.0\lambda$.

The piezoelectric layer may be formed of, for example, any one of lithium tantalate, lithium niobate, zinc oxide, aluminum nitride, and lead zirconate titanate. Further, the low acoustic velocity film may include at least one kind of material selected from a group consisting of silicon oxide, glass, silicon oxynitride, tantalum oxide, and a compound prepared by adding fluorine, carbon, or boron to silicon oxide. Further, the substrate may include at least one kind of material selected from a group consisting of silicon, aluminum nitride, aluminum oxide, silicon carbide, silicon nitride, sapphire, lithium tantalate, lithium niobate, crystal, alumina, zirconia, cordierite, mullite, steatite, forsterite, magnesia, and diamond.

The filter further includes, for example, a spacer layer and a cover member. The spacer layer and the cover member are provided on the first surface of the substrate. The spacer layer surrounds the plurality of IDT electrodes in the plan view seen from the thickness direction of the substrate. In the plan view seen from the thickness direction of the substrate, the spacer layer has a frame-like shape (rectangular frame-like shape). The spacer layer has electrically insulating property. The material of the spacer layer is, for example, synthetic resin such as epoxy resin, polyimide, or the like. The cover member has a plate-like shape. In the plan view seen from the thickness direction of the substrate, the cover member has a rectangular shape. However, the shape of the cover member is not limited thereto and may alternatively be, for example, a square shape. In the filter, the outer shape size of the cover member, the outer shape size of the spacer layer, and the outer shape size of the cover member are substantially the same in the plan view seen from the thickness direction of the substrate. The cover member is arranged on the spacer layer in such a manner as to face the substrate in the thickness direction of the substrate. The cover member overlaps with the plurality of IDT electrodes in the thickness direction of the substrate and is separated from the plurality of IDT electrodes in the thickness direction of the substrate. The cover member has electrically insulating property. The material of the cover member is, for example, synthetic resin, such as epoxy resin, polyimide, or the like. The filter includes space surrounded by the substrate, the spacer layer, and the cover member. In the filter, the space is filled with gas. The gas is, for example, air, an inert gas (for example, nitrogen gas), or the like. A plurality of terminals are exposed from the cover member. Each of the plurality of terminals is, for example, a bump. Each bump is, for example, a solder bump. Each bump is not limited to a solder bump and may alternatively be, for example, a gold bump.

The filter may include, for example, a close contact layer interposed between the low acoustic velocity film and the piezoelectric layer. The close contact layer is composed of, for example, synthetic resin (epoxy resin or polyimide resin). Further, the filter may include a dielectric layer either between the low acoustic velocity film and the piezoelectric layer, or on the piezoelectric layer, or below the low acoustic velocity film.

Further, the filter may include, for example, a high acoustic velocity film interposed between the substrate and the low acoustic velocity film. Here, the high acoustic velocity film is provided on the substrate directly or indirectly. The low acoustic velocity film is provided on the high acoustic velocity film directly or indirectly. The piezoelectric layer is provided on the low acoustic velocity film directly or indirectly. In the high acoustic velocity film, the acoustic velocity of a bulk wave propagating therethrough is higher than the acoustic velocity of an acoustic wave propagating through the piezoelectric layer. In the low acoustic velocity film, the acoustic velocity of a bulk wave propagating therethrough is lower than the acoustic velocity of a bulk wave propagating through the piezoelectric layer.

The high acoustic velocity film is composed of any one of a piezoelectric substance, such as diamond-like carbon, aluminum nitride, aluminum oxide, silicon carbide, silicon nitride, silicon, sapphire, lithium tantalate, lithium niobite, crystal, or the like, a different type of ceramic, such as alumina, zirconia, cordierite, mullite, steatite, forsterite, or the like, magnesia, diamond, a material whose main component is one of the foregoing materials, and a material whose main component is a mixture of one of the foregoing materials.

With regard to the thickness of the high acoustic velocity film, because the high acoustic velocity film has the capability of confining an acoustic wave in the piezoelectric layer and the low acoustic velocity film, it is desirable to have a thickest possible high acoustic velocity film. The piezoelectric substrate may include a close contact layer, a dielectric film, or the like as another film that is different from the high acoustic velocity film, the low acoustic velocity film, and the piezoelectric layer.

Each of the plurality of series arm resonators and the plurality of parallel arm resonators is not limited to the acoustic wave resonator described above and may alternatively be, for example, a SAW resonator or a BAW (Bulk Acoustic Wave) resonator. Here, the SAW resonator includes, for example, a piezoelectric substrate and an IDT electrode provided on the piezoelectric substrate. In the case where each of the plurality of series arm resonators and the plurality of parallel arm resonators is made up of the SAW resonator, the filter includes, on a single piezoelectric substrate, a plurality of IDT electrodes respectively corresponding to the plurality of series arm resonators and a plurality of IDT electrodes respectively corresponding to the plurality of parallel arm resonators. The piezoelectric substrate is, for example, a lithium tantalate substrate, a lithium niobate substrate, or the like.

(5.3) Power Amplifier

Each of the plurality of power amplifiers 21 illustrated in FIG. 3 is, for example, a one-chip IC including a substrate and an amplifying function portion. The substrate has a first surface and a second surface, which face each other. The substrate is, for example, a gallium arsenide substrate. The amplifying function portion includes at least one transistor formed on the first surface of the substrate. The amplifying function portion is a function portion that has the capability of amplifying a transmission signal of a predetermined frequency band. The transistor is, for example, a HBT (Heterojunction Bipolar Transistor). In each power amplifier 21, a power supply voltage from a controller (not illustrated) is applied across the collector and the emitter of the HBT. In addition to the amplifying function portion, each power amplifier 21 may include, for example, a capacitor for cutting a DC component. Each power amplifier 21 is, for example, flip-chip mounted on the first principal surface 51 of the mounting board 5 in such a way that the first surface of the substrate is on the first principal surface 51 side of the mounting board 5. In the plan view seen from the thickness direction of the mounting board 5, the outer shape of each power amplifier 21 is, for example, a rectangular shape.

(5.4) Low Noise Amplifier

Each of the plurality of low noise amplifiers 22 illustrated in FIG. 3 is, for example, a single IC chip including a substrate and an amplifying function portion. The substrate has a first surface and a second surface, which face each other. The substrate is, for example, a silicon substrate. The amplifying function portion is formed on the first surface of the substrate. The amplifying function portion is a function portion that has the capability of amplifying a reception signal of a predetermined frequency band. Each low noise amplifier 22 is, for example, flip-chip mounted on the first principal surface 51 of the mounting board 5 in such a way that the first surface of the substrate is on the mounting board 5 side. In the plan view seen from the thickness direction of the mounting board 5, the outer shape of each low noise amplifier 22 is, for example, a rectangular shape.

(6) Communication Device

As illustrated in FIG. 3, the communication device 9 according to the embodiment 1 includes the radio frequency module 1, the antenna 91, and the signal processing circuit 92.

(6.1) Antenna

The antenna 91 is connected to the antenna terminal 61 of the radio frequency module 1. The antenna 91 has a transmission function of radiating a transmission signal output from the radio frequency module 1 via radio waves and a reception function of receiving a reception signal in the form of radio waves from outside and outputting a received signal to the radio frequency module 1. Examples of the transmission signal include the first transmission signal, the second transmission signal, and the third transmission signal. Examples of the reception signal include the first reception signal, the second reception signal, and the third reception signal.

(6.2) Signal Processing Circuit

The signal processing circuit 92 includes a RF signal processing circuit 93 and a baseband signal processing circuit 94. The signal processing circuit 92 performs processing of the first communication signal (the first transmission signal and the first reception signal), the second communication signal (the second transmission signal and the second reception signal), and the third communication signal (the third transmission signal and the third reception signal).

(6.2.1) RF Signal Processing Circuit

The RF signal processing circuit 93 is, for example, a RFIC (Radio Frequency Integrated Circuit) and performs signal processing on a radio frequency signal. The RF signal processing circuit 93 performs signal processing on a radio frequency signal (transmission signal) output from the baseband signal processing circuit 94 using up-converting and the like, and outputs a radio frequency signal, on which the signal processing has been performed, to the radio frequency module 1. The RF signal processing circuit 93 performs signal processing on a radio frequency signal (reception signal) output from the radio frequency module 1 using down-converting and the like, and outputs a radio frequency signal, on which the signal processing has been performed, to the baseband signal processing circuit 94.

(6.2.2) Baseband Signal Processing Circuit

The baseband signal processing circuit 94 is, for example, a BBIC (Baseband Integrated Circuit) and performs predetermined signal processing on a transmission signal from outside of the signal processing circuit 92. The reception signal processed in the baseband signal processing circuit 94 is used, for example, as an image signal for image display or used as an audio signal for calls.

(7) Advantageous Effects

In the radio frequency module 1 according to the embodiment 1, there are provided the switches SW1 and SW2 that enable to change a load connected to the third inductor L3, and the third inductor L3 is arranged between the first inductor L1 and the second inductor L2. This enables to weaken the coupling between the first inductor L1 and the second inductor L2 when the first path T31 and the second path T32 are used simultaneously. As a result, it becomes possible to increase the isolation between the first path T31 and the second path T32.

In the radio frequency module 1 according to the embodiment 1, the switches SW1 and SW2 that enable to change a load connected to the third inductor L3 and the switch 8 capable of connecting the antenna terminal 61 to the first path T31 and the second path T32 simultaneously are provided. Moreover, the third inductor L3 is arranged between the first inductor L1 and the second inductor L2. This enables to weaken the coupling between the first inductor L1 and the second inductor L2 when the first path T31 and the second path T32 are connected to the antenna terminal 61 simultaneously. As a result, it becomes possible to increase the isolation between communication in the first path T31 and communication in the second path T32.

In the radio frequency module 1 according to the embodiment 1, the switches SW1 and SW2 enable to short-circuit both ends of the third inductor L3. This enables to adjust the respective degrees of inductive coupling between the first inductor L1 and the second inductor L2 of the first path T31 and the second path T32, which are used simultaneously, between the first inductor L1 and the third inductor L3 of the first path T31 and the third path T33, which are not used simultaneously, and between the second inductor L2 and the third inductor L3 of the second path T32 and the third path T33, which are not used simultaneously, after short-circuiting both ends of the third inductor L3. As a result, it becomes possible to further increase the isolation between communication in the first path T31 and communication in the second path T32.

In the radio frequency module 1 according to the embodiment 1, the first inductor L1 and the second inductor L2 are arranged in such a way that the degree of inductive coupling between the first inductor L1 and the second inductor L2 has a positive value. According to this, it becomes possible to further increase the isolation between communication in the first path T31 and communication in the second path T32.

In the radio frequency module 1 according to the embodiment 1, the second inductor L2 is provided in the second path T32 between the reception filter 32 and the low noise amplifier 72C. This enables to reduce the effect of the first inductor L1 on the input side of the low noise amplifier 72C that is relatively susceptible to noises. As a result, it becomes possible to further increase the isolation between communication in the first path T31 and communication in the second path T32.

(8) Modified Example

Hereinafter, modified examples of the embodiment 1 are described.

Figure 4:
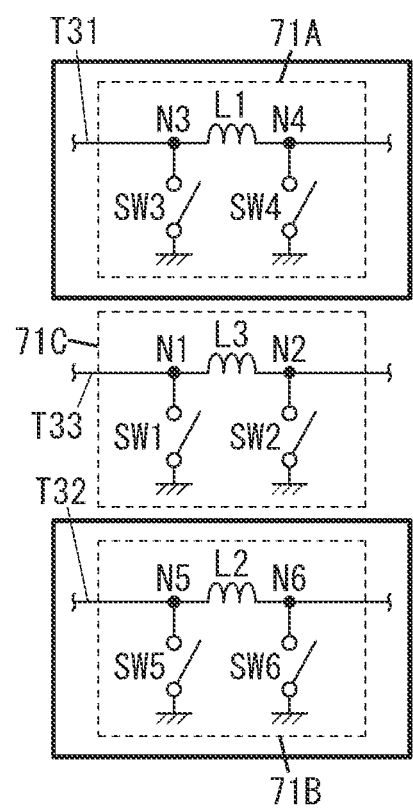
FIG. 4 is a schematic diagram of a relevant part of a radio frequency module according to a modified example 1 of the embodiment 1.

As a modified example 1 of the embodiment 1, in FIG. 4, the first path T31 may be the transmission path T1 through which a transmission signal travels as the first communication signal, and the second path T32 may be the reception path T2 through which a reception signal travels as the second communication signal. The first inductor L1 of the matching circuit 71A may be an inductor of the output matching circuit 41 provided in the transmission path T1, instead of an inductor of the input matching circuit 42. For example, an inductor of the first output matching circuit 41A may be the first inductor L1, and an inductor of the second input matching circuit 42B may be the second inductor L2. Even in such a case, because the third inductor L3 of the matching circuit 71C is arranged between the first inductor L1 and the second inductor L2, it becomes possible to increase the isolation between two paths that are used simultaneously.

Further, at least one of the first inductor L1 and the second inductor L2 may be an inductor of the matching circuit 43. For example, an inductor of the first matching circuit 43A may be the first inductor L1, and an inductor of the second input matching circuit 42B may be the second inductor L2. Even in such a case, because the third inductor L3 is arranged between the first inductor L1 and the second inductor L2, it becomes possible to increase the isolation between two paths that are used simultaneously.

Moreover, at least one of the first inductor L1 and the second inductor L2 may be an inductor of the matching circuit 44. Even in such a case, because the third inductor is arranged between the first inductor L1 and the second inductor L2, it becomes possible to increase the isolation between two paths that are used simultaneously.

Further, the third inductor L3 may be an inductor of the output matching circuit 41 provided in the transmission path, instead of an inductor of the input matching circuit 42. For example, an inductor of the third output matching circuit 41C may be the third inductor L3. Even in such a case, because the third inductor L3 is arranged between the first inductor L1 and the second inductor L2, it becomes possible to increase the isolation.

Figure 5A:
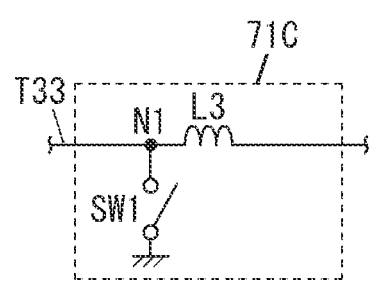
FIG. 5A is a circuit diagram of a relevant part of a radio frequency module according to a modified example 2 of the embodiment 1.

As a modified example 2 of the embodiment 1, as illustrated in FIG. 5A, the matching circuit 71C of the radio frequency module 1 may include only the switch SW1 without necessarily including the switch SW2.

Figure 5B:
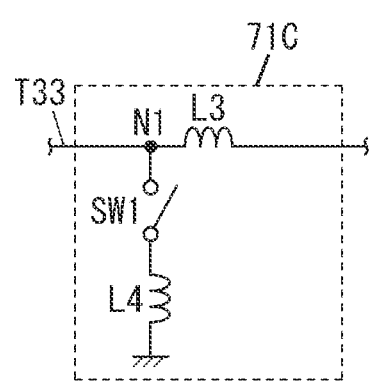
FIG. 5B is a circuit diagram of a relevant part of a radio frequency module according to a modified example 3 of the embodiment 1.

As a modified example 3 of the embodiment 1, the matching circuit 71C of the radio frequency module 1 may include a fourth inductor L4 as illustrated in FIG. 5B. The fourth inductor L4 is provided between the switch SW1 and the ground. That is to say, the fourth inductor L4 is provided between the node N1 in the third path T33 and the ground. By turning the switch SW1 to the ON state, the third inductor L3 and the fourth inductor L4 are connected to each other in series.

Figure 5C:
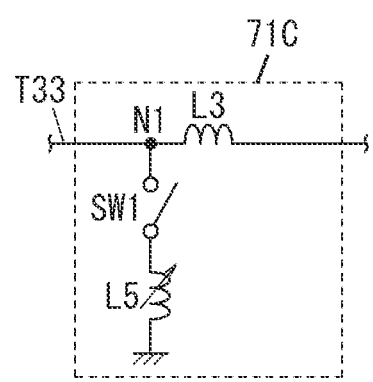
FIG. 5C is a circuit diagram of a relevant part of a radio frequency module according to a modified example 4 of the embodiment 1.

As a modified example 4 of the embodiment 1, the matching circuit 71C of the radio frequency module 1 may include a fourth inductor L5 as illustrated in FIG. 5C. The fourth inductor L5 is a variable inductor capable of changing the inductance thereof. The fourth inductor L4 is provided between the switch SW1 and the ground. By turning the switch SW1 to the ON state, the third inductor L3 and the fourth inductor L5 are connected to each other in series.

Note that as another modified example of the embodiment 1, the first inductor L1 may be provided between a node in the first path T31 and the ground.

Embodiment 2

As illustrated in FIG. 6, a radio frequency module 1 according to an embodiment 2 is different from the radio frequency module 1 (see FIG. 1) according to the embodiment 1 in that the first inductor part L1, the second inductor L2, and the third inductor L3 form a one chip. Note that with regard to the radio frequency module 1 according to the embodiment 2, the same reference characters denote constituent elements similar to those of the radio frequency module 1 according to the embodiment 1, and the descriptions thereof are omitted.

(1) Configuration

As illustrated in FIG. 6, the radio frequency module 1 according to the embodiment 2 includes an inductor component 54.

The inductor component 54 is provided on the first principal surface 51 of the mounting board 5. The inductor component 54 includes a plurality of inductors (the first inductor L1, the second inductor L2, and the third inductor L3). The first inductor L1, the second inductor L2, and the third inductor L3 form a single chip. More specifically, in the inductor component 54, a plurality of inductors are arranged in array. In the inside the inductor component 54, the third inductor L3 is arranged between the first inductor L1 and the second inductor L2. Note that with regard to the first inductor L1, the second inductor L2, and the third inductor L3 of the embodiment 2, no description is provided regarding the configurations and functions similar to those of the first inductor L1, the second inductor L2, and the third inductor L3 of the embodiment 1 (see FIG. 1).

According to the above, because the first inductor L1, the second inductor L2, and the third inductor L3 are arranged in array, it becomes possible to achieve downsizing, compared with the case where the first inductor L1, the second inductor L2, and the third inductor L3 are separate components. Further, it becomes possible to stabilize the degree of coupling between inductors.

(2) Advantageous Effects

In the radio frequency module 1 according to the embodiment 2, the first inductor L1, the second inductor L2, and the third inductor L3 form a single chip. This enables the downsizing of the radio frequency module 1.

(3) Modified Example

As a modified example of the embodiment 2, each modified example of the embodiment 1 may be applied to the radio frequency module 1 according to the embodiment 2. A radio frequency module 1 according to each modified example also produces advantageous effects similar to those of the radio frequency module 1 according to the embodiment 2.

Embodiment 3

Figure 7:
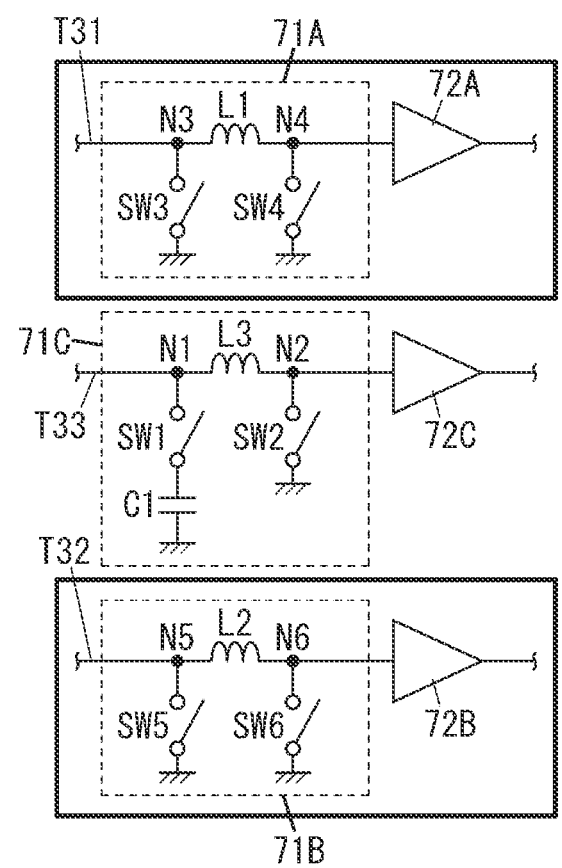
FIG. 7 is a schematic diagram of a relevant part of a radio frequency module according to an embodiment 3.

As illustrated in FIG. 7, a radio frequency module 1 according to an embodiment 3 is different from the radio frequency module 1 (see FIG. 2) according to the embodiment 1 in including a capacitor C1. Note that with regard to the radio frequency module 1 according to the embodiment 3, the same reference characters denote constituent elements similar to those of the radio frequency module 1 according to the embodiment 1, and the descriptions thereof are omitted.

(1) Configuration

As illustrated in FIG. 7, the matching circuit 71C of the embodiment 3 includes the third inductor L3, a plurality of (two in the illustrated example) switches SW1 and SW2, and the capacitor C1. Note that with regard to the matching circuit 71C of the embodiment 3, no description is provided regarding the configurations and functions similar to those of the matching circuit 71C (see FIG. 2) of the embodiment 1.

The capacitor C1 is a load on one end side (the side opposite to the low noise amplifier 72C side) of the third inductor L3 and is provided between the node N1 in the third path T33 and the ground. More specifically, the capacitor C1 is provided between the ground and the switch SW1, which is provided on the input side of the third inductor L3.

The switch SW1 of the embodiment 3 enables to connect and disconnect the third inductor L3 and the capacitor C1. By turning the switch SW1 to the ON state, the third inductor L3 and the capacitor C1 are connected to each other in series, and this enables to form a pole at a specific frequency.

(2) Advantageous Effects

In the radio frequency module 1 according to the embodiment 3, as a load on one end side of the third inductor L3, the capacitor C1 is provided between the node N1 in the third path T33 and the ground. By short-circuiting one end side of the third inductor L3 and connecting the other end side of the third inductor L3 to the capacitor C1, it becomes possible to adjust the degrees of inductive coupling between the first inductor L1 and the second inductor L2, which are used simultaneously, between the first inductor L1 and the third inductor L3, which are not used simultaneously, and between the second inductor L2 and the third inductor L3, which are not used simultaneously. Moreover, because a pole of coupling coefficient can be formed at a specific frequency by using the third inductor L3 and the capacitor C1, it becomes possible to further increase the isolation between communication in the first path T31 and communication in the second path T32 at a specific frequency. As a result, it becomes possible to connect or disconnect the third inductor L3 and the capacitor C1 depending on communication conditions.

(3) Modified Example

As a modified example of the embodiment 3, each modified example of the embodiment 1 may be applied to the radio frequency module 1 according to the embodiment 3. The radio frequency module 1 according to the modified example also produces advantageous effects similar to those of the radio frequency module 1 according to the embodiment 3.

Embodiment 4

Figure 8:
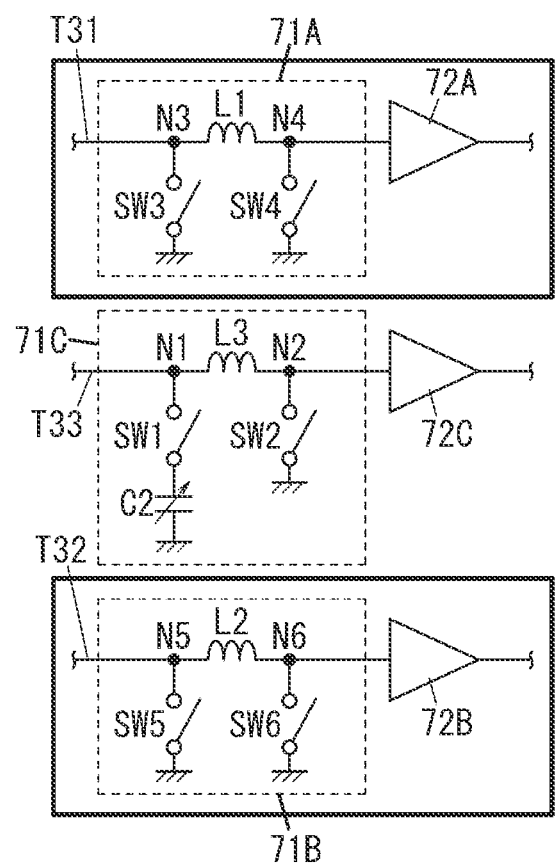
FIG. 8 is a schematic diagram of a relevant part of a radio frequency module according to an embodiment 4.

A radio frequency module 1 according to an embodiment 4 is different from the radio frequency module 1 (see FIG. 7) according to the embodiment 3 in including a capacitor C2 such as illustrated in FIG. 8. Note that with regard to the radio frequency module 1 according to the embodiment 4, the same reference characters denote constituent elements similar to those of the radio frequency module 1 according to the embodiment 3, and the descriptions thereof are omitted.

(1) Configuration

As illustrated in FIG. 8, a matching circuit 71C of the embodiment 4 includes the capacitor C2, instead of the capacitor C1 of the embodiment 3. Further, as is the case with the matching circuit 71C of the embodiment 3, the matching circuit 71C of the embodiment 4 includes the third inductor L3 and a plurality of (two in the illustrated example) switches SW1 and SW2. Note that with regard to the matching circuit 71C of the embodiment 4, no description is provided regarding the configurations and functions similar to those of the matching circuit 71C (see FIG. 7) of the embodiment 3.

The capacitor C2 is a variable capacitor capable of changing the capacitance thereof. The capacitor C2 is provided between the ground and the switch SW1, which is provided on the input side (the side opposite to the third low noise amplifier 22C side) of the third inductor L3. The capacitor C2 can change its capacitance. By turning the switch SW1 to the ON state, the third inductor L3 and the capacitor C2 are connected to each other in series. In this state, by adjusting the capacitance of the capacitor C2, it becomes possible to adjust the frequency at which the pole is formed.

It becomes possible to form a pole corresponding to the degree of coupling between the first inductor L1 and the third inductor L3 and the formed coupling between the second inductor L2 and the third inductor L3 by short-circuiting one end side of the third inductor L3 and connecting the other end side of the third inductor L3 to the capacitor C2. As a result, at a specific frequency, it becomes possible to increase the isolation between the first reception path T21 and the second reception path T22. By adjusting the capacitance of the capacitor C2, it becomes possible to perform the adjustment in accordance with communication bands in the paths that are used simultaneously. It becomes possible to realize the isolation at a suitable frequency by adjusting the degree of coupling between the third inductor L3 and the capacitor C2.

(2) Advantageous Effects

In the radio frequency module 1 according to the embodiment 4, the capacitance of the capacitor C2 is variable. This enables to adjust the pole of coupling coefficient in such a manner as to match use conditions, and thus, it becomes possible to realize optimum isolation in accordance with the use conditions.

(3) Modified Example

As a modified example of the embodiment 4, each modified example of the embodiment 1 may be applied to the radio frequency module 1 according to the embodiment 4. The radio frequency module 1 according to the modified example also produces advantageous effects similar to those of the radio frequency module 1 according to the embodiment 4.

The embodiments and the modified examples described above are only part of various embodiments and modified examples of the present disclosure. Further, the embodiments and the modified examples may be modified in various ways according to the design and the like.

(Aspect)

In the present specification, the following aspects are disclosed.

A radio frequency module (1) according to a first aspect includes a first inductor (L1), a second inductor (L2), a third inductor (L3), and a switch (SW1; SW2). The first inductor (L1) is provided in a first path (T31) through which a first communication signal travels. The second inductor (L2) is provided in a second path (T32) through which a second communication signal travels, the second path (T32) being used simultaneously with the first path (T31). The third inductor (L3) is provided in a third path (T33) through which a third communication signal travels, the third path (T33) not being used simultaneously with the first path (T31). The switch (SW1; SW2) is provided between a node (N1) in the third path (T33) and ground and is connected to the third inductor (L3). The third inductor (L3) is arranged between the first inductor (L1) and the second inductor (L2).

According to the radio frequency module (1) according to the first aspect, it becomes possible to weaken the coupling between the first inductor (L1) and the second inductor (L2) when the first path (T31) and the second path (T32) are used simultaneously. As a result, it becomes possible to increase the isolation between the first path (T31) and the second path (T32).

A radio frequency module (1) according to a second aspect includes a first inductor (L1), a second inductor (L2), a third inductor (L3), a first switch (switch SW1;SW2), and a second switch (switch 8). The first inductor (L1) is provided in a first path (T31) through which a first communication signal travels. The second inductor (L2) is provided in a second path (T32) through which a second communication signal travels. The third inductor (L3) is provided in a third path (T33) through which a third communication signal travels. The first switch is a switch provided between a node (N1) in the third path (T33) and ground. The first switch is connected to the third inductor (L3). The second switch is capable of connecting an antenna terminal (61) to the first path (T31) and the second path (T32) simultaneously. The third inductor (L3) is arranged between the first inductor (L1) and the second inductor (L2).

According to the radio frequency module (1) according to the second aspect, it becomes possible to weaken the coupling between the first inductor (L1) and the second inductor (L2) when the first path (T31) and the second path (T32) are simultaneously connected to an antenna terminal (61). As a result, it becomes possible to increase the isolation between communication in the first path (T31) and communication in the second path (T32).

In a radio frequency module (1) according to a third aspect, in the first or second aspect, the first inductor (L1) is connected in series between two nodes (N1, N2) in the first path (T31).

In a radio frequency module (1) according to a fourth aspect, in the first or second aspect, the first inductor (L1) is provided between a node in the first path (T31) and the ground.

In a radio frequency module (1) according to a fifth aspect, in any one of the first to fourth aspects, the switch (SW1, SW2) enables to short-circuit both ends of the third inductor (L3).

According to the radio frequency module (1) according to the fifth aspect, it becomes possible to adjust the respective degrees of inductive coupling between the first inductor (L1) and the second inductor (L2) of the first path (T31) and the second path (T32), which are used simultaneously, between the first inductor (L1) and the third inductor (L3) of the first path (T31) and the third path (T33), which are not used simultaneously, and between the second inductor (L2) and the third inductor (L3) of the second path (T32) and the third path (T33), which are not used simultaneously, after short-circuiting both ends of the third inductor (L3). As a result, it becomes possible to further increase the isolation between communication in the first path (T31) and communication in the second path (T32).

A radio frequency module (1) according to a sixth aspect further includes a capacitor (C1; C2) in any one of the first to fifth aspects. The capacitor (C1; C2) is provided between the node (N1) in the third path (T33) and the ground and is connected in series to the switch (SW1). The switch (SW1) enables to connect and disconnect the third inductor (L3) and the capacitor (C1; C2).

According to the radio frequency module (1) according to the sixth aspect, by short-circuiting one end side of the third inductor (L3) and connecting the other end side of the third inductor (L3) to the capacitor (C1; C2), it becomes possible to adjust the degrees of inductive coupling between the first inductor (L1) and the second inductor (L2), which are used simultaneously, between the first inductor (L1) and the third inductor (L3), which are not used simultaneously, and between the second inductor (L2) and the third inductor (L3), which are not used simultaneously. Moreover, it becomes possible to form a pole of coupling coefficient at a specific frequency by using the third inductor (L3) and the capacitor (C1; C2), and this enables to further increase the isolation between communication in the first path (T31) and communication in the second path (T32). As a result, it becomes possible to connect or disconnect the third inductor (L3) and the capacitor (C1; C2) depending on communication conditions.

In a radio frequency module (1) according to a seventh aspect, in the sixth aspect, the capacitance of the capacitor (C2) is variable.

The radio frequency module (1) according to the seventh aspect enables to adjust the pole of coupling coefficient in such a manner as to match use conditions, and thus, it becomes possible to realize optimum isolation in accordance with the use conditions.

A radio frequency module (1) according to an eighth aspect further includes a fourth inductor (L4; L5) in any one of the first to fifth aspects. The fourth inductor (L4; L5) is provided between the node (N1) in the third path (T33) and the ground and is connected in series to the switch (SW1). The switch (SW1) enables to connect and disconnect the third inductor (L3) and the fourth inductor (L4; L5).

In a radio frequency module (1) according to a ninth aspect, in the eighth aspect, the inductance of the fourth inductor (L5) is variable.

In a radio frequency module (1) according to a tenth aspect, in any one of the first to ninth aspects, the first inductor (L1) and the second inductor (L2) are arranged in such a way that the degree of inductive coupling between the first inductor (L1) and the second inductor (L2) has a positive value.

The radio frequency module (1) according to the tenth aspect enables to further increase the isolation between communication in the first path (T31) and communication in the second path (T32).

In a radio frequency module (1) according to an eleventh aspect, in any one of the first to tenth aspects, the first inductor (L1), the second inductor (L2), and the third inductor (L3) form a single chip.

The radio frequency module (1) according to the eleventh aspect enables to downsize the radio frequency module (1).

In a radio frequency module (1) according to a twelfth aspect, in any one of the first to eleventh aspects, the second inductor (L2) is provided in the second path (T32) between a reception filter (32) and a low noise amplifier (72B).

The radio frequency module (1) according to the twelfth aspect enables to reduce the effect of the first inductor (L1) on the input side of a low noise amplifier (72C) that is relatively susceptible to noises. As a result, it becomes possible to further increase the isolation between communication in the first path (T31) and communication in the second path (T32).

In a radio frequency module (1) according to a thirteenth aspect, in any one of the first to twelfth aspects, the first path (T31) is a transmission path (T1) through which a transmission signal travels as the first communication signal. The second path (T32) is a reception path (T2) through which a reception signal travels as the second communication signal.

A communication device (9) according to a fourteenth aspect includes the radio frequency module (1) according to any one of the first to thirteenth aspects and a signal processing circuit (92). The signal processing circuit (92) performs processing on the first communication signal, the second communication signal, and the third communication signal.

According to the communication device (9) according to the fourteenth aspect, in the radio frequency module (1), it becomes possible to weaken the coupling between the first inductor (L1) and the second inductor (L2) when the first path (T31) and the second path (T32) are simultaneously used. As a result, it becomes possible to increase the isolation between communication in the first path (T31) and communication in the second path (T32).

REFERENCE SIGNS LIST

1 Radio frequency module
21 Power amplifier
21A First power amplifier
21B Second power amplifier
21C Third power amplifier
22 Low noise amplifier
22A First low noise amplifier
22B Second low noise amplifier
22C Third Low noise amplifier
31 Transmission filter
31A First transmission filter
31B Second transmission filter
31C Third transmission filter
32 Reception filter
32A First reception filter
32B Second reception filter
32C Third reception filter
41 Output matching circuit
41A First output matching circuit
41B Second output matching circuit
41C Third output matching circuit
42 Input matching circuit
42A First input matching circuit
42B Second input matching circuit
42C Third input matching circuit
43 Matching circuit
43A First matching circuit
43B Second matching circuit
43C Third matching circuit
44 Matching circuit
5 Mounting board
51 First principal surface
52, 53 Chip
54 Inductor component
6 External connection terminal
61 Antenna terminal
62 Input terminal
621 First input terminal
622 Second input terminal
623 Third input terminal
63 Output terminal
631 First output terminal
632 Second output terminal
633 Third output terminal
71A Matching circuit
71B Matching circuit
71C Matching circuit
72A-72C Low noise amplifier
8 Switch (second switch)
81 Common terminal
82-84 Selection terminal
9 Communication device
91 Antenna
92 Signal processing circuit
93 RF signal processing circuit
94 Baseband signal processing circuit
L1 First inductor
L2 Second inductor
L3 Third inductor
L4, L5 Fourth inductor
C1, C2 Capacitor
SW1-SW6 Switch (first switch)

T1 Transmission path
T11 First transmission path
T12 Second transmission path
T13 Third transmission path
T2 Reception path
T21 First reception path
T22 Second reception path
T23 Third reception path
T31 First path
T32 Second path
T33 Third path
N1, N2 Node

The invention claimed is:

1. A radio frequency module comprising:
   a first inductor connected to a first path through which a first communication signal travels;
   a second inductor connected in a second path through which a second communication signal travels, the second communication signal traveling simultaneously with the first communication signal;
   a third inductor connected in a third path through which a third communication signal travels, the third communication signal not traveling simultaneously with the first communication signal; and
   a switch connected between the third path and ground, the switch being connected to the third inductor,
   wherein the third inductor is physically arranged on a mounting board between the first inductor and the second inductor.

2. The radio frequency module according to claim 1, wherein the first inductor is connected in series between two nodes in the first path.

3. The radio frequency module according to claim 1, wherein the first inductor is connected between the first path and ground.

4. The radio frequency module according to claim 1, wherein the switch is configured to short-circuit both ends of the third inductor.

5. The radio frequency module according to claim 1, further comprising:
   a capacitor connected between the third path and ground, the capacitor being connected to the switch in series,
   wherein the switch is configured to selectively connect and disconnect the third inductor and the capacitor.

6. The radio frequency module according to claim 1, further comprising:
   a fourth inductor connected between the third path and ground, the fourth inductor being connected to the switch in series,
   wherein the switch is configured to selectively connect and disconnect the third inductor and the fourth inductor.

7. The radio frequency module according to claim 1, wherein the first inductor and the second inductor are arranged in such a way that a degree of inductive coupling between the first inductor and the second inductor has a positive value.

8. The radio frequency module according to claim 1, wherein the second inductor is connected in the second path between a reception filter and a low noise amplifier.

9. The radio frequency module according to claim 1, wherein:
   the first path is a transmission path and the first communication signal is a transmission signal, and
   the second path is a reception path and the second communication signal is a reception signal.

10. A communication device comprising:
    the radio frequency module according to claim 1; and
    a signal processing circuit configured to process the first communication signal, the second communication signal, and the third communication signal.

11. A radio frequency module comprising:
    a first inductor connected to a first path through which a first communication signal travels;
    a second inductor connected in a second path through which a second communication signal travels;
    a third inductor connected in a third path through which a third communication signal travels;
    a first switch connected between the third path and ground, the first switch being connected to the third inductor, and
    a second switch configured to selectively connect an antenna terminal to the first path and the second path simultaneously,
    wherein the third inductor is physically arranged on a mounting board between the first inductor and the second inductor.

12. The radio frequency module according to claim 11, wherein the first inductor is connected in series between two nodes in the first path.

13. The radio frequency module according to claim 11, wherein the first inductor is connected between the first path and ground.

14. The radio frequency module according to claim 11, wherein the first switch is configured to short-circuit both ends of the third inductor.

15. The radio frequency module according to claim 11, further comprising:
    a capacitor connected between the third path and ground, the capacitor being connected to the first switch in series,
    wherein the first switch is configured to selectively connect and disconnect the third inductor and the capacitor.

16. The radio frequency module according to claim 11, further comprising:
    a fourth inductor connected between the third path and ground, the fourth inductor being connected to the first switch in series,
    wherein the first switch is configured to selectively connect and disconnect the third inductor and the fourth inductor.

17. The radio frequency module according to claim 11, wherein the first inductor and the second inductor are arranged in such a way that a degree of inductive coupling between the first inductor and the second inductor has a positive value.

18. The radio frequency module according to claim 11, wherein the second inductor is connected in the second path between a reception filter and a low noise amplifier.

19. The radio frequency module according to claim 11, wherein:
    the first path is a transmission path and the first communication signal is a transmission signal, and
    the second path is a reception path and the second communication signal is a reception signal.

20. A communication device comprising:
    the radio frequency module according to claim 11; and
    a signal processing circuit configured to process the first communication signal, the second communication signal, and the third communication signal.

* * * * *